United States Patent

Inoue

(10) Patent No.: US 8,896,874 B2
(45) Date of Patent: Nov. 25, 2014

(54) COMMUNICATION APPARATUS AND CONTROL METHOD THEREOF, COMMUNICATION SYSTEM, AND STORAGE MEDIUM

(71) Applicant: Canon Kabushiki Kaisha, Tokyo (JP)

(72) Inventor: Go Inoue, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/197,937

(22) Filed: Mar. 5, 2014

(65) Prior Publication Data

US 2014/0268224 A1    Sep. 18, 2014

(30) Foreign Application Priority Data

Mar. 15, 2013    (JP) .................................. 2013-054143

(51) Int. Cl.
| | |
|---|---|
| *G06F 3/12* | (2006.01) |
| *G06K 15/02* | (2006.01) |
| *G06F 17/00* | (2006.01) |
| *H04H 20/71* | (2008.01) |
| *H04B 1/18* | (2006.01) |

(52) U.S. Cl.
CPC ............ *G06F 3/1211* (2013.01); *G06F 3/1236* (2013.01); *G06F 3/1292* (2013.01)
USPC ........ 358/1.15; 358/1.13; 358/1.16; 707/622; 455/3.01; 455/3.05; 455/153.2

(58) Field of Classification Search
None
See application file for complete search history.

(56) References Cited

U.S. PATENT DOCUMENTS

| | | | | |
|---|---|---|---|---|
| 2013/0260683 | A1* | 10/2013 | Suzuki et al. ................ | 455/41.1 |
| 2014/0044010 | A1* | 2/2014 | Hiroshige et al. ............ | 370/254 |

FOREIGN PATENT DOCUMENTS

JP     2000-163348 A    6/2000

* cited by examiner

*Primary Examiner* — Thomas Lett
(74) *Attorney, Agent, or Firm* — Fitzpatrick, Cella, Harper & Scinto

(57) ABSTRACT

A communication apparatus according to one aspect of the present invention determines, in a case where a communication request for communicating with an external apparatus has occurred, whether direct wireless communication between a communication terminal and the communication apparatus with one of the communication terminal and the communication apparatus functioning as an access point is being executed or not. In a case where it is determined that the direct wireless communication is being executed, controls the communication apparatus to not communicate with the external apparatus based on the communication request until a communication method switches from the direct wireless communication to a different communication method, and causes communication with the external apparatus based on the communication request to be executed using the different communication method in response to switching of the communication method.

17 Claims, 12 Drawing Sheets

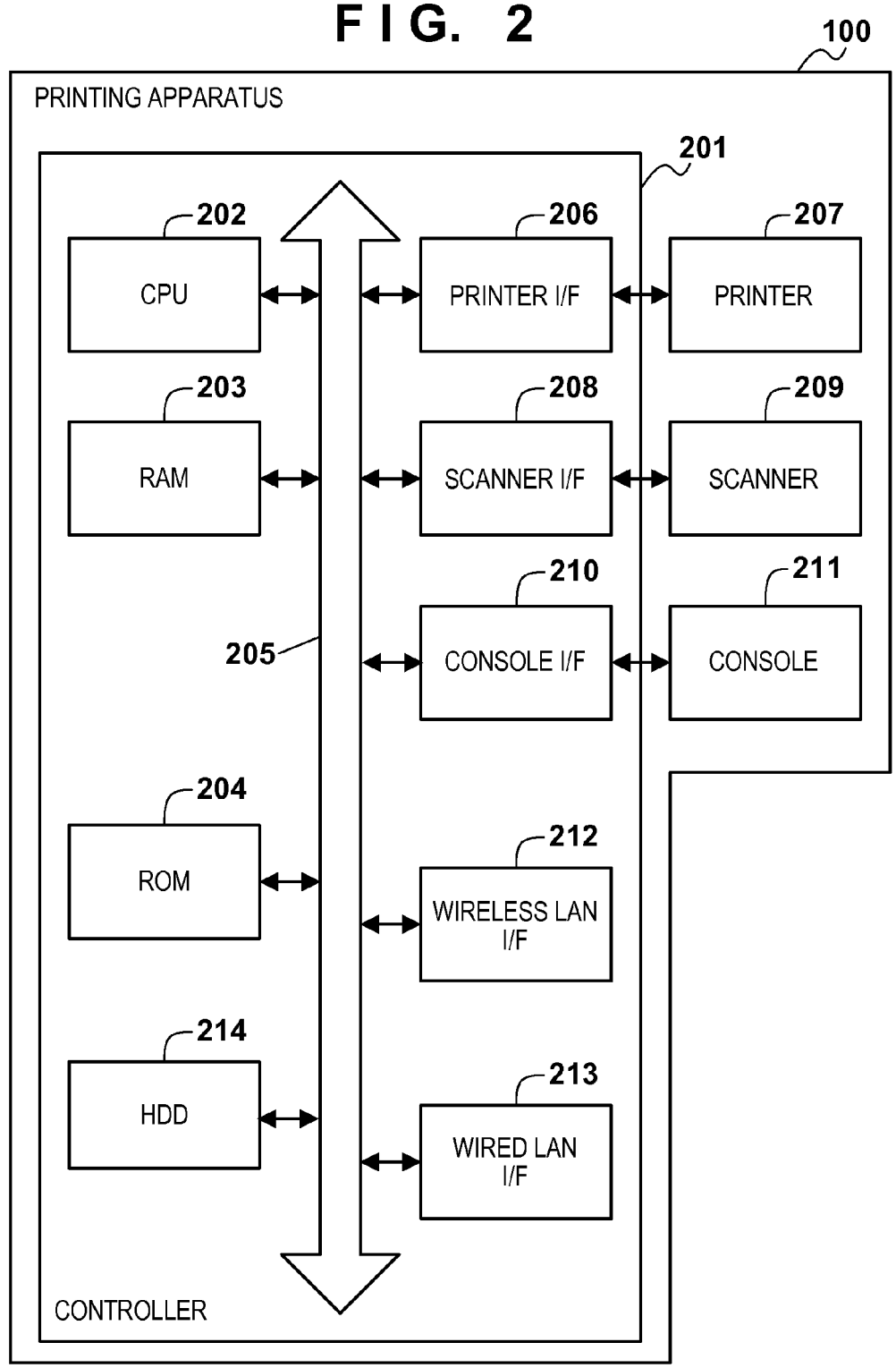

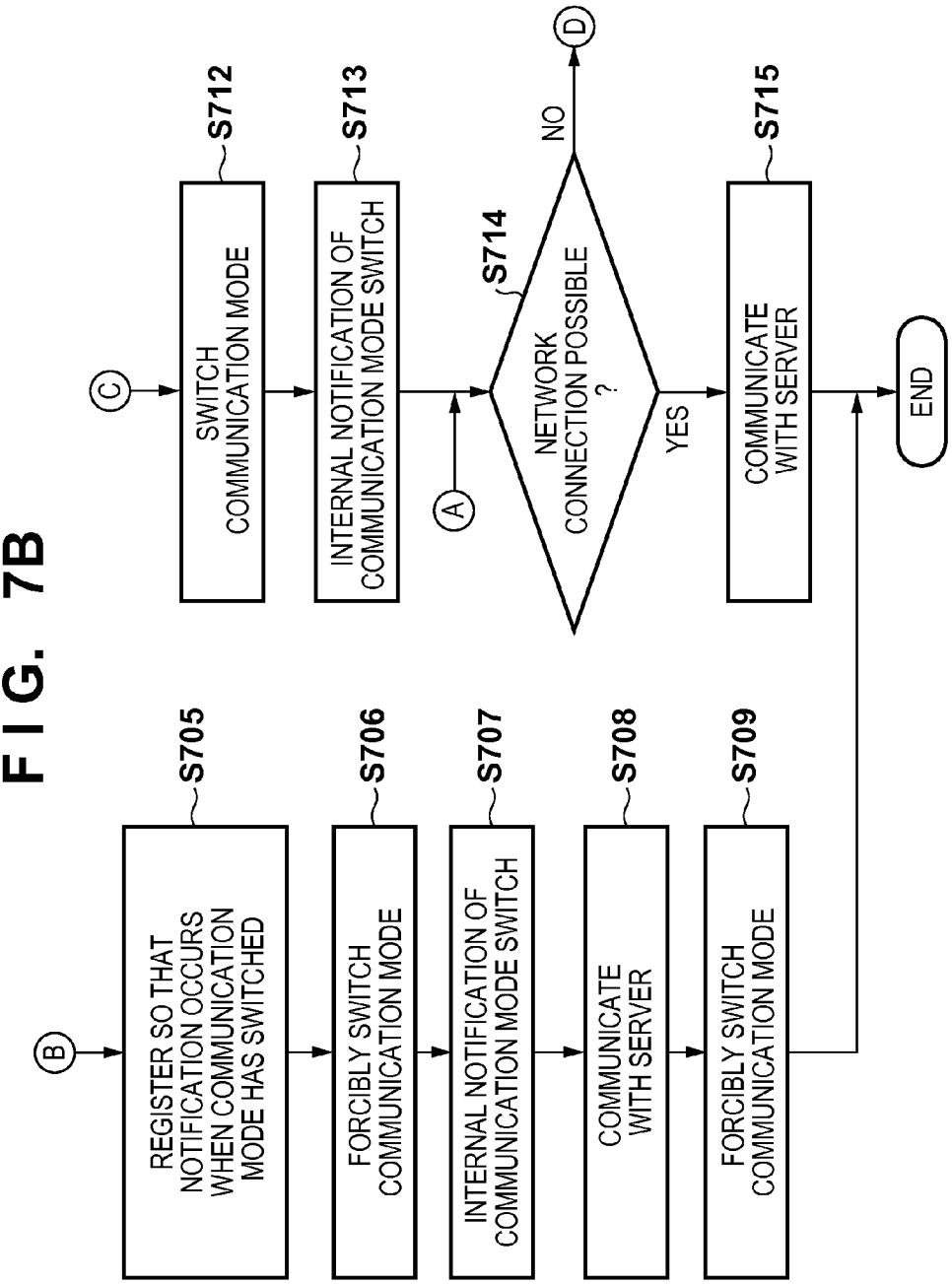

F I G. 9
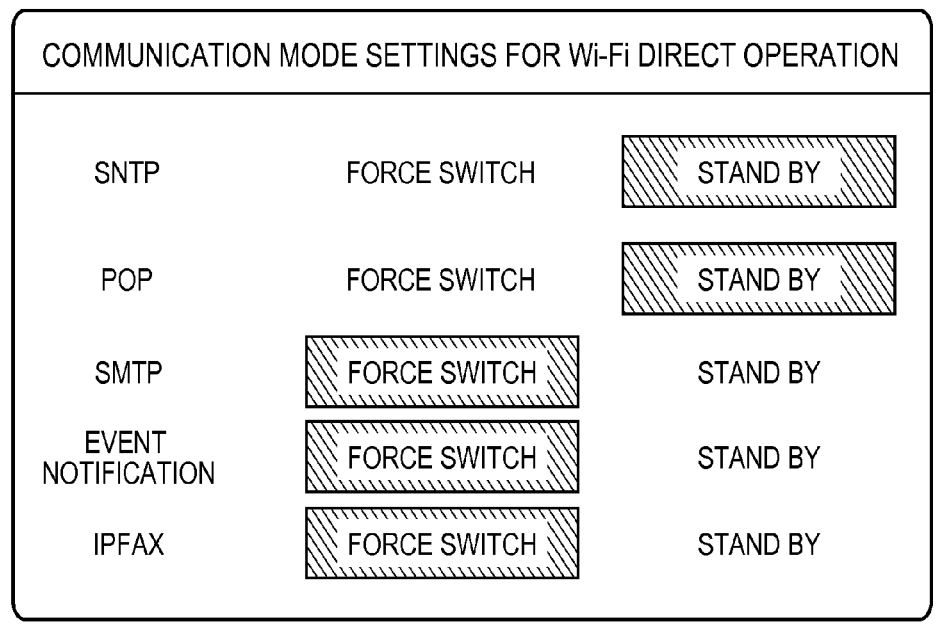

COMMUNICATION APPARATUS AND CONTROL METHOD THEREOF, COMMUNICATION SYSTEM, AND STORAGE MEDIUM

BACKGROUND OF THE INVENTION

1. Field of the Invention

The present invention relates to communication apparatuses and control methods thereof, communication systems, and storage medium.

2. Description of the Related Art

Recent years have seen an increase in printing apparatuses, such as multifunction peripherals, printers, and the like, that include wireless LAN functionality. Printing apparatuses that include wireless LAN functionality typically have a function for wirelessly connecting to an access point as a client. Meanwhile, by communicating with the printing apparatus via the access point, PCs, mobile terminals, and the like can cause the printing apparatus to execute printing by transmitting desired data thereto, and can be used to manage the printing apparatus by receiving device information from the printing apparatus.

The Wi-Fi Direct® standard has recently been established by the Wi-Fi Alliance. Wi-Fi Direct defines a protocol for determining whether a wireless terminal will function as an access point or as a client. Which wireless terminal will function as an access point and which wireless terminal will function as a client can be determined automatically by executing this protocol. Using Wi-Fi Direct enables wireless terminals to communicate with each other directly and execute various types of application services (image sharing, printing, and the like) without needing to prepare a separate access point.

Printing apparatuses capable of executing the aforementioned protocol are configured so that a user can use a console or the like to instruct whether to carry out direct wireless communication using Wi-Fi Direct, or to carry out wireless communication indirectly via a third-party access point.

Meanwhile, recent printing apparatuses often include applications for communicating with a server. Simple Network Time Protocol (SNIP) and Post Office Protocol (POP) can be given as examples of applications that periodically communicate with a server. Such printing apparatuses also have event transmission applications for communicating with a server in the case where an event such as an error has occurred. Furthermore, such printing apparatuses have timed transmission applications, such as Simple Mail Transfer Protocol (SMTP), IPFAX (Internet Protocol Fax), and so on, in which the apparatus communicates with a server when a given time has been reached.

However, such applications cannot communicate with the server in the Wi-Fi Direct environment, and thus if an application for communicating with a server is activated while the printing apparatus is operating in Wi-Fi Direct, there is a problem that the communication fails.

To solve such a problem, a technique has been proposed in which a retransmission time is extended until communication with a server is possible and retransmission is repeated until communication with the server succeeds (Japanese Patent Laid-Open No. 2000-163348, for example). According to the technique disclosed in Japanese Patent Laid-Open No. 2000-163348, the communication with the server succeeds after the printing apparatus switches to an infrastructure mode.

However, the retransmission process is executed in the Wi-Fi Direct environment in Japanese Patent Laid-Open No. 2000-163348, which can result in unnecessary communication, errors, and the like, leading in turn to unnecessary processing being performed by a CPU. There is a further problem in that the application cannot communicate with the server in the Wi-Fi Direct environment, resulting in transmission failures that remain in a history as transmission errors.

Meanwhile, depending on the communicating application, there are cases where it is preferable to immediately switch to the infrastructure mode and communicate with the server, rather than waiting to switch to the infrastructure mode. For example, in the case where an error, an urgent event such as a paper jam, or the like has occurred in the printing apparatus, it is necessary to immediately notify the server of the status of the printing apparatus. Downtime in the printing apparatus can be reduced by the server that received the notification transferring the information to an administrator or the like and having the administrator proceed immediately to the location of the printing apparatus.

However, with the aforementioned conventional technique, the server cannot be notified of the status of the printing apparatus until the printing apparatus switches to the infrastructure mode, even if an urgent event has occurred while the printing apparatus is operating in Wi-Fi Direct. This delays the administrator's response and leads to longer downtime in the printing apparatus.

In addition, there is demand for higher reliability in timed transmission functions for IPFAX, email transmission, and so on. Accordingly, if the printing apparatus is operating in Wi-Fi Direct when the timer reaches the specified time, the printing apparatus will be unable to communicate with the server at that time and the transmission will fail. Furthermore, even if the printing apparatus transmits to the server upon the printing apparatus switching to the infrastructure mode, the transmission will occur at a different time than that intended by the user, causing a problem in that the printing apparatus operates less reliably.

SUMMARY OF THE INVENTION

Having been achieved in light of the aforementioned problems with the conventional techniques, the present invention provides a communication technique for a case where a communication request for communicating with an external apparatus has occurred while a communication apparatus is communicating with a communication terminal in a wireless communication mode in which wireless communication is possible by any of the communication apparatus and the communication terminal functioning as an access point.

According to one aspect of the present invention, there is provided a communication apparatus, comprising: a wireless communication unit capable of executing direct wireless communication between a communication terminal and the communication apparatus with one of the communication terminal and the communication apparatus functioning as an access point; a communication unit capable of executing communication between an external apparatus and the communication apparatus, which is a different communication method from communication using the wireless communication unit; a determination unit configured to determine whether or not the wireless communication unit is executing communication in a case where a communication request for communicating with the external apparatus has occurred; and a control unit configured to, in a case where the determination unit has determined that the wireless communication unit is executing communication, control the communication apparatus to not communicate with the external apparatus based on the communication request until the communication method switches from communication using the wireless communication unit to communication using the communication unit, and cause the communication unit to communicate with the external apparatus based on the communication request in response to switching of the communication method from communication using the wireless communication unit to communication using the communication unit.

According to another aspect of the present invention, there is provided a communication apparatus, comprising: a wireless communication unit capable of executing direct wireless communication between a communication terminal and the communication apparatus with one of the communication terminal and the communication apparatus functioning as an access point; a communication unit capable of executing communication between an external apparatus and the communication apparatus, which is a different communication method from communication using the wireless communication unit; a determination unit configured to determine whether or not the wireless communication unit is executing communication in a case where a communication request for communicating with the external apparatus has occurred; and a control unit configured to switch the communication method from communication using the wireless communication unit to communication using the communication unit and cause the communication unit to communicate with the external apparatus based on the communication request in response to the determination unit determining that the wireless communication unit is executing communication.

According to still another aspect of the present invention, there is provided a communication system including an external apparatus, a communication apparatus, and a communication terminal, wherein when the communication apparatus and the communication terminal are communicating in a wireless communication mode in which one of the communication terminal and the communication apparatus serves as an access point and the communication apparatus communicates wirelessly with the communication terminal, and a communication request for communicating with the external apparatus has occurred in the communication apparatus, the communication apparatus does not communicate with the external apparatus based on the communication request until a communication method switches from communication in the wireless communication mode to a communication method aside from the wireless communication mode; and the communication with the external apparatus based on the communication request is executed when the communication method has switched from communication in the wireless communication mode to the communication method aside from the wireless communication mode.

According to yet another aspect of the present invention, there is provided a control method for a communication apparatus that communicates with a communication terminal, the method comprising: executing direct wireless communication between a communication terminal and the communication apparatus with one of the communication terminal and the communication apparatus functioning as an access point; executing communication between an external apparatus and the communication apparatus, which is a different communication method from the direct wireless communication; determining whether or not the direct wireless communication is being executed in a case where a communication request for communicating with the external apparatus has occurred; and in a case where it is determined that the direct wireless communication is being executed, controlling the communication apparatus to not communicate with the external apparatus based on the communication request until a communication method switches from the direct wireless communication to the different communication method, and causing communication with the external apparatus based on the communication request to be executed using the different communication method in response to switching of the communication method from the direct wireless communication to the different communication method.

According to still yet another aspect of the present invention, there is provided a non-transitory computer readable storage medium storing a computer program for causing a computer to execute steps of a control method for a communication apparatus that communicates with a communication terminal, the method comprising: executing direct wireless communication between a communication terminal and the communication apparatus with one of the communication terminal and the communication apparatus functioning as an access point; executing communication between an external apparatus and the communication apparatus, which is a different communication method from the direct wireless communication; determining whether or not the direct wireless communication is being executed in a case where a communication request for communicating with the external apparatus has occurred; and in a case where it is determined that the direct wireless communication is being executed, controlling the communication apparatus to not communicate with the external apparatus based on the communication request until a communication method switches from the direct wireless communication to the different communication method, and causing communication with the external apparatus based on the communication request to be executed using the different communication method in response to switching of the communication method from the direct wireless communication to the different communication method.

According to the present invention, a transmission error can be prevented from occurring when a communication request for communicating with an external apparatus has occurred while a communication apparatus is communicating with another apparatus in a wireless communication mode in which wireless communication is possible by any of the communication apparatus and the other apparatus functioning as an access point.

Further features of the present invention will become apparent from the following description of exemplary embodiments (with reference to the attached drawings).

BRIEF DESCRIPTION OF THE DRAWINGS

FIG. 2 is a block diagram illustrating the hardware configuration of a printing apparatus according to embodiments of the present invention.

FIG. 7A and FIG. 7B are flowcharts illustrating a process performed by a printing apparatus when a communication request for communicating with a server has occurred and communication is performed having determined whether or not to switch a communication mode based on the urgency, reliability, and so on of an application, according to a third embodiment of the present invention.

FIG. 9 is a diagram illustrating an example of a screen displayed in a console of the printing apparatus according to the fourth embodiment of the present invention.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

Figure 1A:
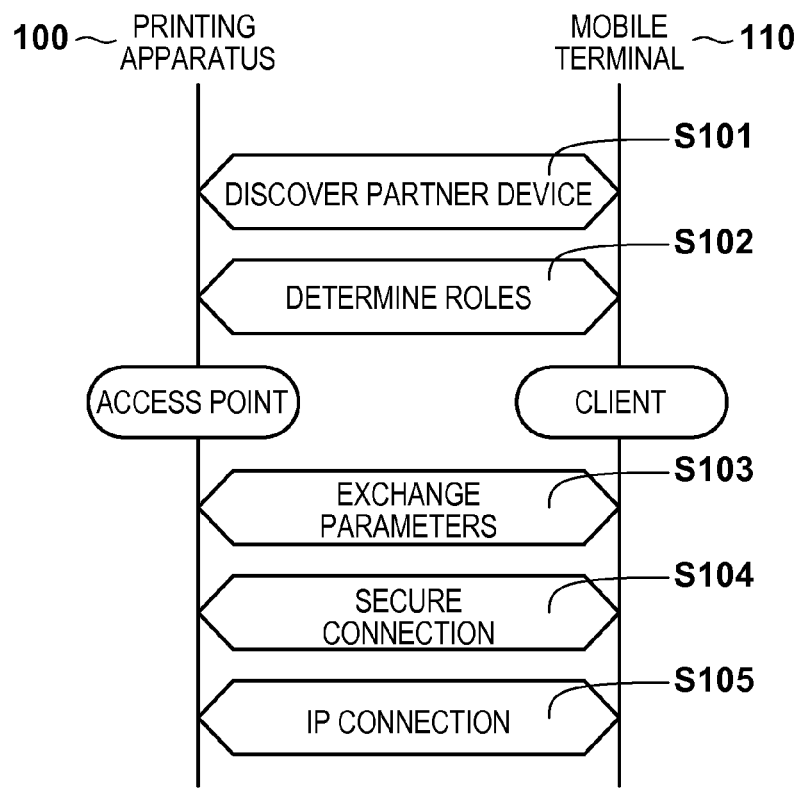
FIG. 1A is a diagram illustrating a Wi-Fi Direct processing sequence.

FIG. 1A is a diagram illustrating a Wi-Fi Direct processing sequence.

It is assumed here that a printing apparatus 100 and a mobile terminal 110 are both capable of communicating in a Wi-Fi Direct mode.

First, in S101, the printing apparatus 100 and the mobile terminal 110 each search for other nearby communication terminals that are attempting to connect wirelessly through Wi-Fi Direct, and detect each other. Upon detecting the respective partners, in S102, it is determined which partner will serve as an access point (a GroupOwner) and which will serve as a client. It is assumed here that the role determination results in the printing apparatus 100 serving as the access point and the mobile terminal 110 serving as the client.

Next, in S103, the printing apparatus 100, which is serving as the access point, provides parameters for the wireless connection to the mobile terminal 110, which is serving as the client, by using Wi-Fi Protected Setup (WPS). Then, in S104, a wireless connection is established between the printing apparatus 100 and the mobile terminal 110 using the stated parameters. Once the wireless connection is established, in S105, addressing is carried out between the printing apparatus 100 and the mobile terminal 110 for IP communication. Here, the printing apparatus 100, which is serving as the access point, plays the role of DHCP server, and assigns a predetermined IP address to the mobile terminal 110, which is serving as the client.

The foregoing has described a basic sequence for Wi-Fi Direct communication. By executing this sequence, direct communication between an application service provided in the printing apparatus 100 and an application service provided in the mobile terminal 110 can be enabled.

Figure 1B:
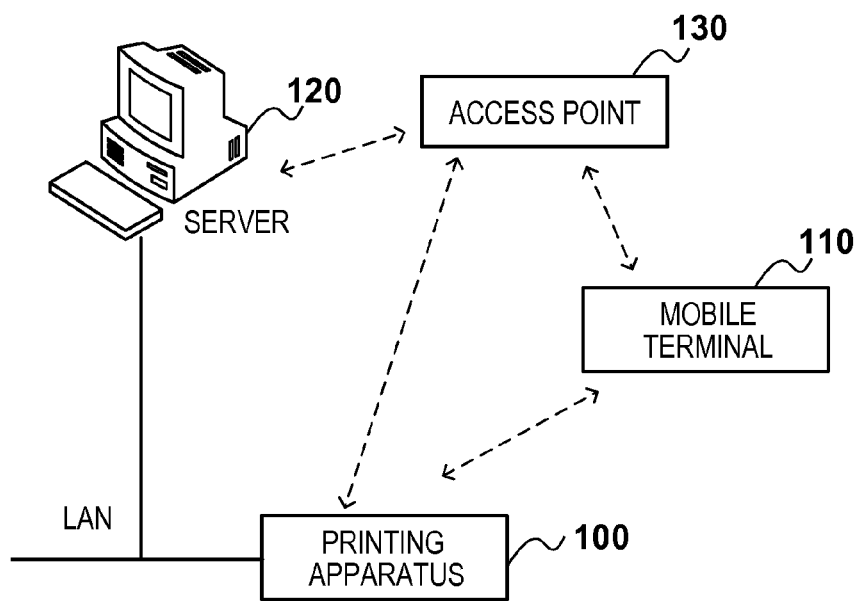
FIG. 1B is a diagram illustrating the configuration of a communication system according to embodiments of the present invention.

FIG. 1B is a diagram illustrating the configuration of a communication system according to embodiments of the present invention.

Here, the printing apparatus 100 and the mobile terminal 110 communicate through Wi-Fi Direct, and the printing apparatus 100 communicates with a server 120 over a wired network or wirelessly via an access point 130 using an infrastructure mode. Note that FIG. 1B does not explicitly indicate the wired connection.

FIG. 2 is a block diagram illustrating the hardware configuration of the printing apparatus 100 according to embodiments of the present invention.

A controller 201 that includes a CPU 202 controls the operations of the printing apparatus 100 as a whole. The CPU 202 carries out various types of control, such as communication control, by loading control programs stored in a ROM 204 or an HDD 214 into a RAM 203 and executing those programs. The RAM 203 functions as the main memory, a working area, and so on for the CPU 202. The HDD 214 stores data, various types of programs, or various types of information tables. A printer I/F 206 functions as an interface for outputting image signals to a printer 207 (a printer engine). A scanner I/F 208 functions as an interface for inputting image signals obtained by a scanner 209 (a scanner engine) reading documents. During copy operations, the CPU 202 processes an image signal input from the scanner I/F 208, outputs the resulting signal as an image signal for recording to the printer I/F 206, after which printing is executed. A console I/F 210 connects a console 211 to the controller 201. The console 211 includes a display unit having touch panel functionality, a keyboard, and so on. The specific configuration of the console 211 will be described later with reference to FIG. 4A and FIG. 4B.

A wireless LAN I/F 212 transmits information to external apparatuses such as the mobile terminal 110 wirelessly, or receives various types of information from the external apparatuses. A wired LAN I/F 213 transmits information to external apparatuses (not shown) over a wired LAN (Ethernet®), or receives various types of information from the external apparatuses. The various blocks in the controller 201 are connected to each other via a system bus 205.

Figure 3:
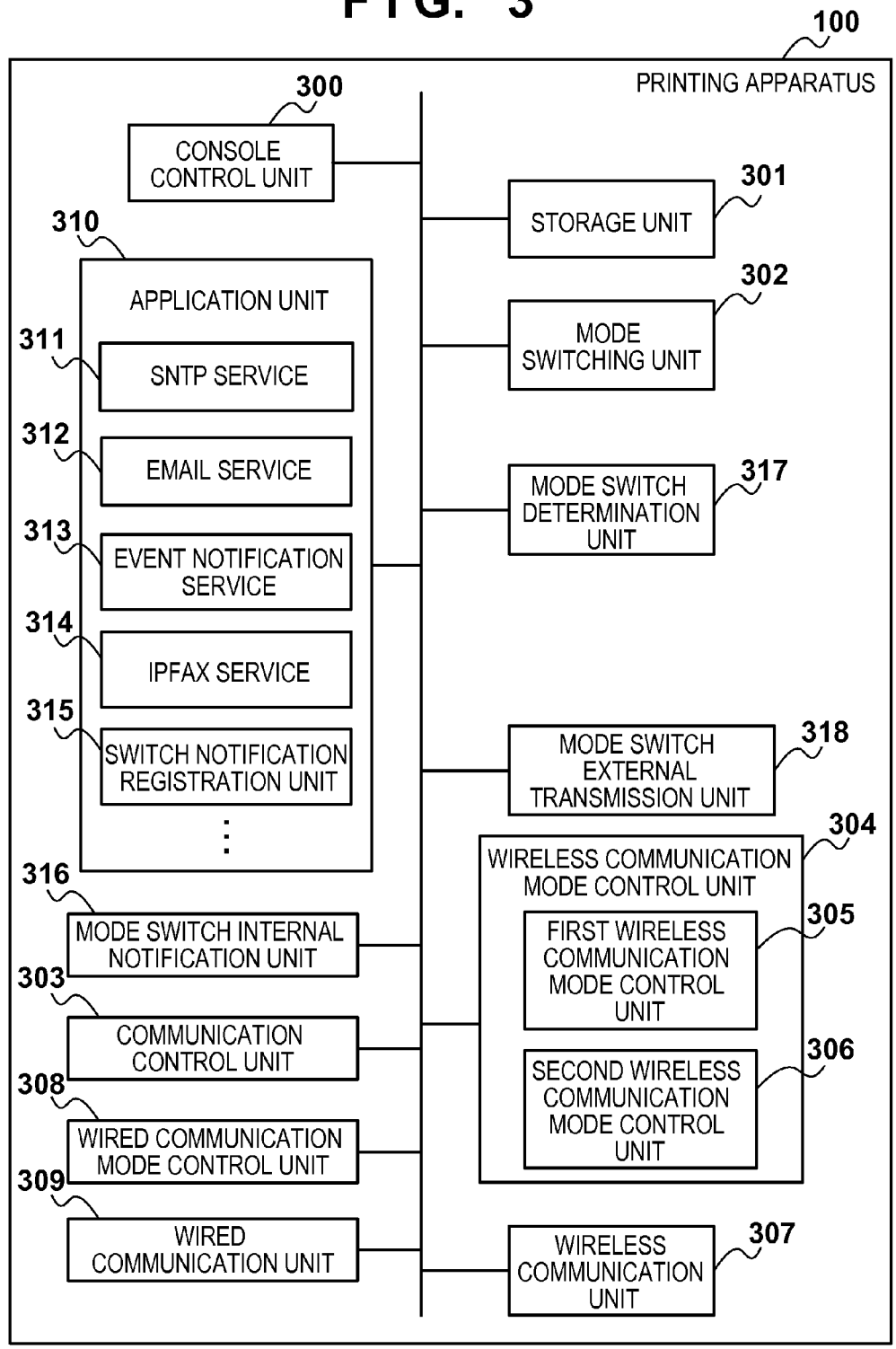
FIG. 3 is a functional block diagram illustrating the software configuration of a printing apparatus according to embodiments of the present invention.

FIG. 3 is a functional block diagram illustrating the software configuration of the printing apparatus 100 according to embodiments of the present invention. The functional units shown in FIG. 3 are realized by the CPU 202 of the printing apparatus 100 executing control programs loaded into the RAM 203 from the ROM 204 or the HDD 214.

An operation control unit 300 controls the console 211. The operation control unit 300 displays an operation menu in the console 211 and accepts the input of instructions from the user, notifies other functional units of the details of the instructions accepted through the console 211, and displays results of the instructions in the console 211. A storage unit 301 stores specified data in the RAM 203, the HDD 214, or the like, or reads out data stored in the RAM 203, the HDD 214, or the like, in response to instructions from other functional units.

A mode switching unit 302 executes a process for switching communication modes of the printing apparatus 100. The communication modes include a mode in which communication is carried out over a wired LAN (a wired mode) and modes in which communication is carried out over a wireless LAN (wireless communication modes). The wireless communication modes include a first wireless communication mode and a second wireless communication mode. The first wireless communication mode is a mode in which the printing apparatus 100 wirelessly communicates with the server 120 or the mobile terminal 110 via an access point 103 (an infrastructure mode). The second wireless communication mode is a mode in which the printing apparatus 100 and the mobile terminal 110 directly communicate with each other wirelessly using Wi-Fi Direct, for example (the Wi-Fi Direct mode). When the printing apparatus 100 communicates with the mobile terminal 110 in the second wireless communication mode, the printing apparatus 100 and the mobile terminal 110 connect wirelessly and communicate directly, with one serving as the access point and the other serving as the client.

A communication control unit 303 carries out communication control when the printing apparatus 100 communicates with an external apparatus such as the mobile terminal 110. Specifically, the communication control unit 303 passes data, that is to be transmitted, from an application unit 310 to a wireless communication unit 307 or a wired communication unit 309, and causes the data to be sent over the network. In addition, the communication control unit 303 passes data received via the wireless communication unit 307 or the wired communication unit 309 to the application unit 310.

A wireless communication mode control unit 304 controls the wireless communication modes. The wireless communication mode control unit 304 further includes a first wireless communication mode control unit 305 and a second wireless communication mode control unit 306. The first wireless communication mode control unit 305 controls communication when the printing apparatus 100 is operating in the first wireless communication mode (the infrastructure mode). The second wireless communication mode control unit 306 controls communication when the printing apparatus 100 is operating in the second wireless communication mode (the Wi-Fi Direct mode). The wireless communication unit 307 controls the wireless LAN I/F 212, and in the case where the printing apparatus 100 is operating in a wireless communication mode, transmits and receives data when the application unit 310 communicates with an external apparatus such as the mobile terminal 110.

A wired communication mode control unit 308 controls communication in the wired mode. The wired communication unit 309 controls the wired LAN I/F 213, and in the case where the printing apparatus 100 is operating in the wired mode, transmits and receives data when the application unit 310 communicates with the external apparatus.

The application unit 310 includes various types of services, such as an SNTP service 311, an email service 312, an event notification service 313, an IPFAX service 314, and so on. The SNTP service 311 transmits data requesting current time information from the wireless communication unit 307 or the wired communication unit 309 to an SNTP server, via the communication control unit 303. The SNTP service 311 receives a response from the SNTP server through the wireless communication unit 307 or the wired communication unit 309, via the communication control unit 303, and sets the obtained time information in the printing apparatus 100. The email service 312 includes an SMTP controller that transmits email and a POP controller that receives email. The SMTP controller transmits data of the email to be sent to an SMTP server from the wireless communication unit 307 or the wired communication unit 309, via the communication control unit 303. The POP controller transmits email reception request data to a POP server from the wireless communication unit 307 or the wired communication unit 309, via the communication control unit 303. In the case where an event such as an error, a paper jam, or the like has occurred in the printing apparatus 100, the event notification service 313 transmits event information to an event server from the wireless communication unit 307 or the wired communication unit 309, via the communication control unit 303. The IPFAX service 314 transmits FAX transmission data to an IPFAX server from the wireless communication unit 307 or the wired communication unit 309, via the communication control unit 303. The IPFAX service 314 also receives FAX reception data from the IPFAX server. A switch notification registration unit 315 registers applications that are to be notified in the case where the communication mode of the printing apparatus 100 has switched. As a result, applications registered in the switch notification registration unit 315 can be notified when the communication mode has switched. A mode switch internal notification unit 316 notifies the switch notification registration unit 315 in the case where the communication mode of the printing apparatus 100 has switched.

When an application is to monitor the switching of the communication mode, that application is registered in the switch notification registration unit 315. Then, when a communication mode switching process occurs, the mode switch internal notification unit 316 transmits switch information indicating that the communication mode has been switched to the switch notification registration unit 315. Having received the switch information, the switch notification registration unit 315 notifies the registered application that the communication mode has been switched. A mode switch determination unit 317 determines whether or not the communication mode will switch in the case where an event has occurred in an application. In the case where the mode switch determination unit 317 has determined that the communication mode of the printing apparatus 100 will switch, a mode switch external transmission unit 318 notifies a partner communication terminal of the switching of the communication mode before and after the communication mode switches.

Note that it is necessary for the application unit 310 and the communication control unit 303 to be capable of operating in a plurality of modes simultaneously in order for two or more modes, namely the wired mode, the first wireless communication mode, and the second wireless communication mode, to be executed simultaneously. However, there are some printing apparatuses in which the included application unit 310, communication control unit 303, or the like are not capable of operating in a plurality of modes simultaneously. In such a printing apparatus, the wired mode, the first wireless communication mode, and the second wireless communication mode operate exclusively, and thus the printing apparatus can only operate in one of those modes. In this case, the user can select which of the communication modes the printing apparatus is to operate in via the console 211.

Figure 4A:
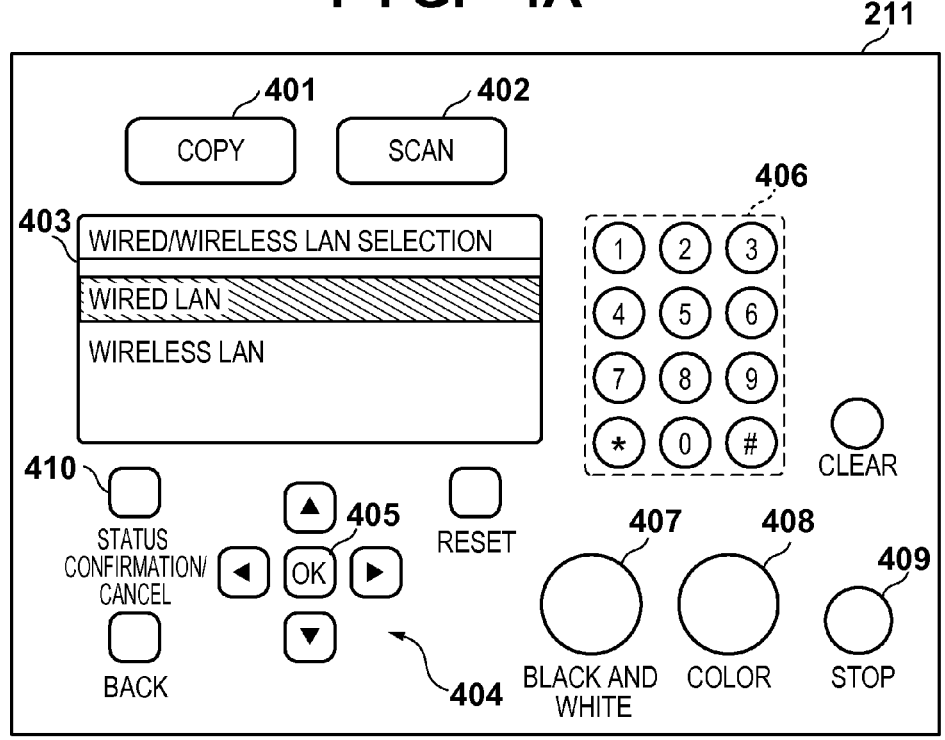
FIG. 4A is a plan view illustrating a console in a printing apparatus according to embodiments of the present invention.

FIG. 4A is a plan view of the console 211 in the printing apparatus 100 according to the present embodiment.

The printing apparatus 100 according to the present embodiment has a scanning function provided by the scanner 209, a copy function provided by the printer 207 and the scanner 209, and so on. The printing apparatus further includes a function for printing in response to an instruction received from an external apparatus such as the mobile terminal 110 through the wireless LAN I/F 212, the wired LAN I/F 213, or the like.

Next, the console 211 will be described.

The console 211 includes a copy function button 401 and a scanning function button 402, serving as keys for selecting the aforementioned functions, and the user depresses the button corresponding to the function s/he wishes to use. In addition, the console 211 includes a display unit 403 for notifying the user of the status of settings, the status of the printing apparatus 100, and so on. Arrow keys 404 are used to move a cursor or the like displayed in the display unit 403. The arrow keys 404 include four buttons corresponding to the up, down, left, and right directions. An OK key 405 is disposed in the center of the arrow keys 404, and functions as a "set" key for making settings, inquiries, and the like. For example, in the case where the user wishes to change copy settings (the paper size, for example), s/he enters a copy function screen by depressing the copy function button 401, and when the user then selects an item to be changed (the paper size) using the arrow keys 404 and depresses the OK key 405, the screen transitions to a settings screen in which the settings can be selected. The user can move the cursor to the location of a desired setting in the settings screen by manipulating the arrow keys 404, and can finalize the setting by depressing the OK key 405. The user employs a numerical keypad 406 to input numerical values, such as a number of copies.

A black-and-white start key 407 and a color start key 408 are provided as keys for instructing the start of copying, scanning, and so on. The color start key 408 is shown because the present embodiment assumes that a color copy function is provided. However, only the black-and-white start key 407 need be provided in printing apparatuses that also include a black-and-white scanning function or that only have a black-and-white printing function. Furthermore, the start keys are not limited to those shown in FIG. 4A, such as with a printing apparatus that has functionality for discriminating between color documents and black-and-white documents when reading documents, for example. A stop key 409 is a key for instructing the operations of the various functions to stop. As another way for stopping operations, the user can display a status confirmation screen for processes being executed by the printing apparatus 100 by manipulating a status confirmation/cancel key 410, select a process to be canceled in the status confirmation screen, and stop that process. The selection and confirmation is carried out using the arrow keys 404 and the OK key 405 in this case as well.

It should be noted that the display unit 403 shown in FIG. 4A indicates a state in which menu items for switching between the wired mode and the wireless communication modes are displayed as a result of the user navigating a menu hierarchy by manipulating the arrow keys 404, the OK key 405, and so on. Two selections, namely "wired LAN" and "wireless LAN", are displayed under a menu item "select wired/wireless LAN". Here, when the user moves the cursor to "wired LAN" and depresses the OK key 405, the printing apparatus 100 begins operating in the wired mode. On the other hand, when the user moves the cursor to "wireless LAN" by manipulating the arrow keys 404 and depresses the OK key 405, the printing apparatus 100 begins operating in a wireless communication mode, and furthermore, a "wireless LAN settings" menu, shown in FIG. 4B, is displayed in the display unit 403.

Figure 4B:
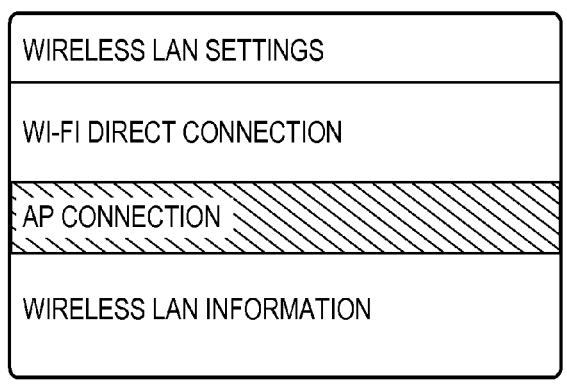
FIG. 4B is a diagram illustrating an example of a "wireless LAN settings" menu screen displayed in a display unit.

A selection menu indicating "Wi-Fi Direct connection", "AP connection", and "wireless LAN information" is displayed in the "wireless LAN settings" menu shown in FIG. 4B. When the user moves the cursor to "Wi-Fi Direct connection" and depresses the OK key 405, the printing apparatus 100 begins communication operations in the second wireless communication mode. However, when the user moves the cursor to "AP connection" and depresses the OK key 405, the printing apparatus 100 begins communication operations in the first wireless communication mode. Finally, when the user moves the cursor to "wireless LAN information" and depresses the OK key 405, the screen transitions to a screen displaying various types of status information for confirming a wireless LAN connection status of the printing apparatus 100.

First Embodiment

Figure 5:
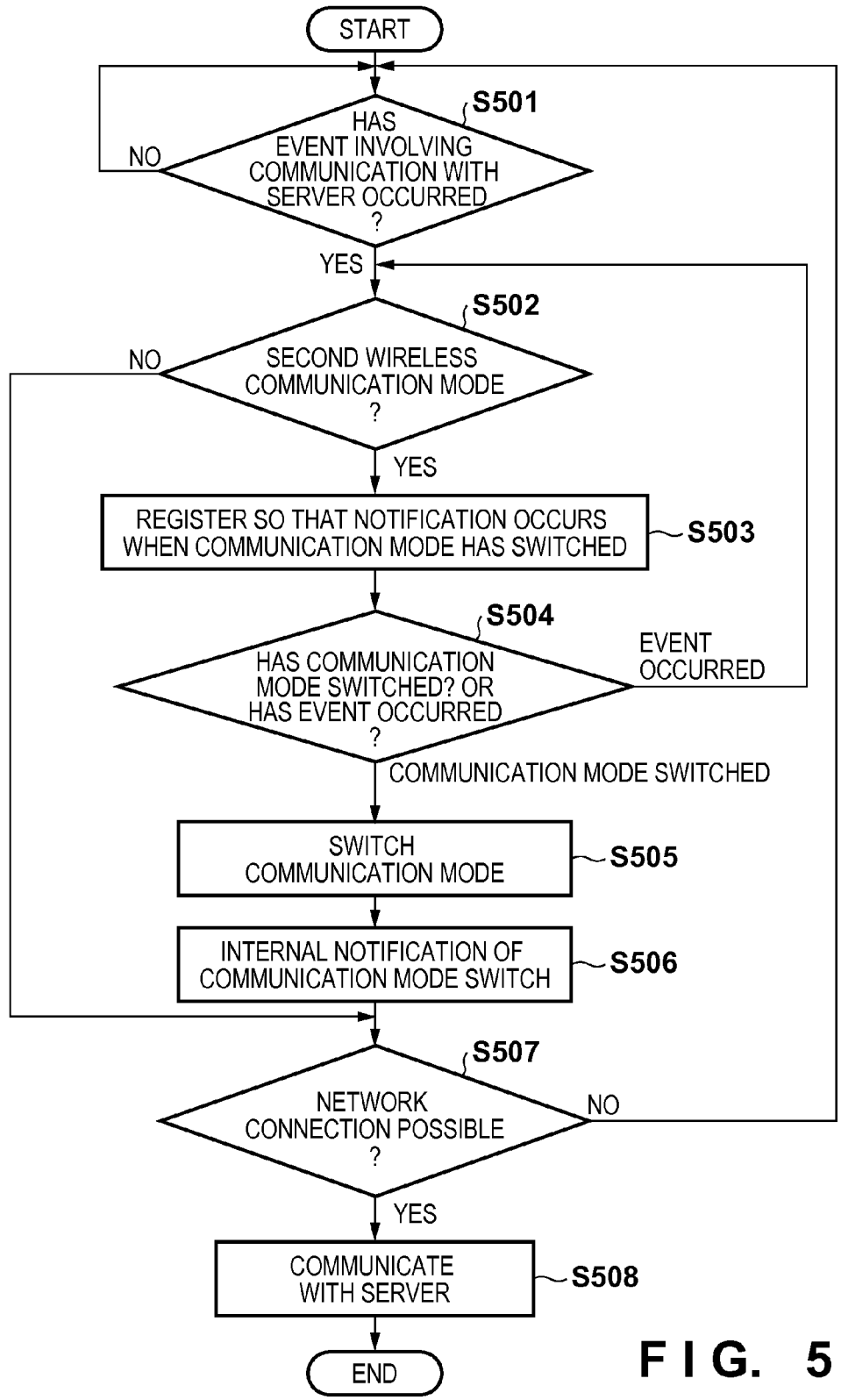
FIG. 5 is a flowchart illustrating a process performed by a printing apparatus when a communication request for communicating with a server has occurred, according to a first embodiment of the present invention.

FIG. 5 is a flowchart illustrating a process, performed by the printing apparatus 100, for communicating with the server 120 when the communication mode has switched rather than executing a communication process with the server 120 immediately when a communication request for the server 120 has occurred, according to a first embodiment of the present invention. In FIG. 5, S501 to S508 indicate respective processing steps. A program for causing the CPU 202 to execute a control procedure corresponding to the steps is loaded into the RAM 203 of the controller 201 at the time of execution, and the processing thereof is implemented by the CPU 202 executing that program.

First, in S501, the CPU 202 determines whether or not an event involving communication with the server 120 has occurred, and stands by at S501 in the case where such an event has not occurred. In terms of the example shown in FIG. 3, the determination as to whether or not the event has occurred is carried out by an application in the application unit 310. When the CPU 202 determines in S501 that the event has occurred, the process advances to S502, where the CPU 202 determines whether or not the current communication mode is the second wireless communication mode (the Wi-Fi Direct mode). In terms of the example shown in FIG. 3, this determination is executed by the communication control unit 303. In the case where the CPU 202 has determined in S502 that the printing apparatus 100 is not operating in the second wireless communication mode, the process advances to S507, where the CPU 202 determines whether or not the printing apparatus 100 can connect to a network. For example, in the case where the printing apparatus 100 is operating in the wired mode, it is determined that the printing apparatus 100 cannot connect to a network if a wired network cable is not connected to the printing apparatus 100. Likewise, in the case where the printing apparatus 100 is operating in the first wireless communication mode (where the printing apparatus 100 communicates wirelessly via an access point), the CPU 202 determines that the printing apparatus 100 cannot connect to a network if the access point is not configured. In the case where the CPU 202 has determined in S507 that the printing apparatus 100 can connect to a network, the process advances to S508, where information regarding the event that has occurred is transmitted to the server 120 and the process ends. On the other hand, in the case where the CPU 202 has determined in S507 that the printing apparatus 100 cannot connect to a network, the process returns to S501 without the printing apparatus 100 connecting to the server 120; the printing apparatus 100 then stands by until the occurrence of the next event requesting a connection to the server 120.

Meanwhile, in the case where the CPU 202 has determined in S502 that the printing apparatus 100 is operating in the second wireless communication mode, the process advances to S503. Here, the CPU 202 does not execute a process for connecting to the server 120. The CPU 202 makes a registration so that the application unit 310 is notified when the communication mode has switched to a communication mode aside from the second wireless communication mode. This registration is made in the switch notification registration unit 315. While the printing apparatus 100 is operating in the second wireless communication mode, a server connection will fail even if a request for connecting to the server has been transmitted; thus this registration ensures that unnecessary transmission processing will not be carried out.

The process then advances to S504, where the CPU 202 determines whether a communication mode switch will occur, or whether an event for communicating with the server 120 will occur in another application. When it is determined that a communication mode switch will occur, the CPU 202 advances the process to S505, whereas when an event for communicating with the server will occur in another application, the process returns to S502.

When the communication mode is switched from the second wireless communication mode to the wired mode or the first wireless communication mode in S504 due to, for example, the user operating the console 211, the process advances to S505, where the CPU 202 carries out a process for switching the communication mode.

In terms of the example shown in FIG. 3, this is carried out by the mode switching unit 302. In the switch process of S505, the mode switching unit 302 first issues a command to end communication to the second wireless communication mode control unit 306. Having received the end command, the second wireless communication mode control unit 306 ends the operations in the second wireless communication mode. When the ending process is complete, the second wireless communication mode control unit 306 notifies the mode switching unit 302 that the second wireless communication mode has ended. In the case where the communication mode is to be switched to the "wired mode", the mode switching unit 302 issues an activation command to the wired communication mode control unit 308. Likewise, in the case where the communication mode is to be switched to the "first wireless communication mode", an activation command is issued to the first wireless communication mode control unit 305. The wired communication mode control unit 308 or the first wireless communication mode control unit 305 that has received the activation command executes an activation process for the corresponding communication mode. When the activation processes are complete, the control units 308 and 305 notify the mode switching unit 302 that the activations are complete. Through this, the mode switching unit 302 notifies the mode switch internal notification unit 316 that all processes required to switch the communication mode are complete. As a result, the mode switch internal notification unit 316 notifies the switch notification registration unit 315 that the communication mode has been switched. In this manner, in S506, the switch notification registration unit 315 notifies the application that is registered to receive a notification when the communication mode is switched of the communication mode switch.

The process then advances to S507, where the CPU 202 determines whether or not the printing apparatus 100 can connect to the network; in the case where it is determined that the printing apparatus 100 can connect to the network, the process advances to S508, where the CPU 202 transmits a connection request to the server 120 and executes a communication process. To describe the determination process of S507 in terms of the example shown in FIG. 3, the communication mode switch can be determined based on whether the application unit 310 has been notified, via the switch notification registration unit 315, that the communication mode has switched to a communication mode aside from the second wireless communication mode. Through this, the application can establish communication with the server 120 and can transmit data based on the event.

The printing apparatus according to the first embodiment described thus far does not communicate with the server while operating in the Wi-Fi Direct mode even if an event requiring communication with the server has occurred. Instead, the printing apparatus communicates with the server once the communication mode has switched to the infrastructure mode. As a result, the printing apparatus does not attempt unnecessary communication that will result in transmission errors with the server, which makes it possible to lighten the burden on the CPU and reduce the occurrence of unnecessary errors.

Second Embodiment

Next, a second embodiment of the present invention will be described. The second embodiment has a characteristic in which when an event requesting communication with a server occurs while the printing apparatus 100 is operating in the Wi-Fi Direct mode, the communication mode is forcibly switched and communication is carried out with the server. Note that the configuration of the printing apparatus 100, the software configuration, and so on in the second embodiment are the same as in the aforementioned first embodiment, and thus descriptions thereof will be omitted.

Figure 6:
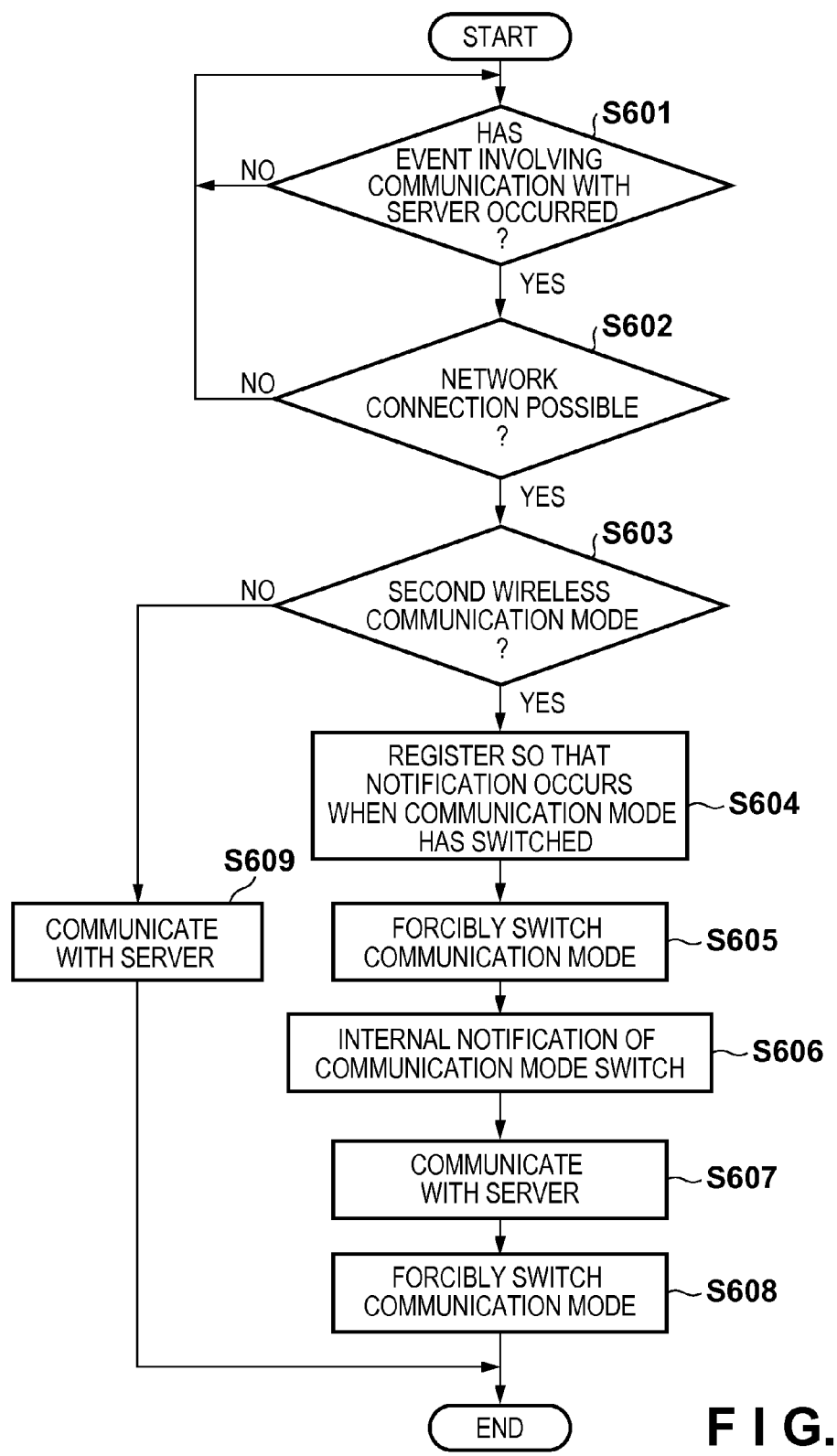
FIG. 6 is a flowchart illustrating a process performed by a printing apparatus when a communication request for communicating with a server has occurred, according to a second embodiment of the present invention.

FIG. 6 is a flowchart illustrating a process performed by the printing apparatus 100 when a communication request for communicating with a server has occurred, according to the second embodiment of the present invention. S601 to S609 indicate respective processing steps; a program for causing the CPU 202 to execute a control procedure corresponding to the steps is loaded into the RAM 203 of the controller 201 at the time of execution, and the processing thereof is implemented by the CPU 202 executing that program.

First, in S601, the CPU 202 determines whether or not an event involving communication with the server 120 has occurred, in the same manner as in S501. In the case where it has been determined in S601 that the event has occurred, the process advances to S602, where the CPU 202 determines whether or not the printing apparatus 100 can connect to a network, in the same manner as in S507. In the case where it has been determined that the printing apparatus 100 cannot connect to a network, the process returns to S601 without connecting to the server 120 for communication, and the printing apparatus 100 stands by until the next event for communicating with the server.

In the case where the CPU 202 has determined in S602 that the printing apparatus 100 can connect to a network, the process advances to S603, where the CPU 202 determines whether or not the current communication mode is the second wireless communication mode, in the same manner as in S502. In the case where it is determined that the current communication mode is not the second wireless communication mode, the process advances to S609, where the CPU 202 connects to the server for communication through the communication control unit 303, transmits information regarding the occurrence of the event to the server 120, and ends the processing.

On the other hand, in the case where the CPU 202 has determined in S603 the printing apparatus 100 is operating in the second wireless communication mode, the process advances to S604. In S604, the CPU 202 makes a registration so that the application unit 310 is notified when the communication mode is switched to a communication mode aside from the second wireless communication mode, in the same manner as S503 of FIG. 5. To describe this in terms of the example shown in FIG. 3, the application unit 310 makes a registration in the switch notification registration unit 315 so that the application unit 310 is notified when the communication mode has switched to a communication mode aside from the second wireless communication mode.

The process then advances to S605, where the CPU 202 carries out a process for forcibly ending communication in the second wireless communication mode and switching the communication mode. To describe this in terms of the example shown in FIG. 3, the application unit 310 requests the mode switching unit 302 to switch the communication mode. Having received this request, the mode switching unit 302 carries out a process for switching the communication mode to the "wired mode" or the "first wireless communication mode" in which communication with the server is possible. As a basis for this switch, for example, the communication mode executed immediately prior to the communication in the second wireless communication mode may be stored in the RAM 203, and the wired mode or the first wireless communication mode may be selected having referred to the communication mode stored in the RAM 203. Alternatively, in the case where the event is the same event as an S501, the communication method used during the previous event may be stored in the RAM 203, and the wired mode or the first wireless communication mode may be selected having referred to the communication method stored in the RAM 203.

The mode switch internal notification unit 316 is notified when the mode switching unit 302 has completed all the processes necessary for switching the communication mode. As a result, the mode switch internal notification unit 316 notifies the switch notification registration unit 315 that the communication mode has been switched. In this manner, in S606, the switch notification registration unit 315 notifies the application that is registered to receive a notification when the communication mode is switched of the communication mode switch.

Next, the process advances to S607, where the CPU 202 transmits a request for connection to the server 120 and executes a process for communicating with the server 120. To describe this in terms of the example shown in FIG. 3, the application unit 310 is notified, via the switch notification registration unit 315, that the communication mode has switched to a communication mode aside from the second wireless communication mode. As a result, the application unit 310 transmits the request to connect to the server 120 and transmits information regarding the event through the communication control unit 303.

When the process for communicating with the server 120 is complete, the process advances to S608, where the CPU 202 carries out a process for switching to the second wireless communication mode. To describe this process in terms of FIG. 3, the application unit 310 requests the mode switching unit 302 to switch the communication mode to the "second wireless communication mode". Having received this request, the mode switching unit 302 carries out a process for switching to the second wireless communication mode.

With the printing apparatus according to the second embodiment as described thus far, even if the printing apparatus is operating in the Wi-Fi Direct mode when a request for communicating with the server occurs, communication can be carried out with the server by forcibly switching the communication mode.

Third Embodiment

Next, a third embodiment of the present invention will be described. The third embodiment has a characteristic in which when an event requesting communication with a server occurs while the printing apparatus 100 is operating in the Wi-Fi Direct mode, the communication mode is forcibly switched based on the application being executed that time, after which communication is carried out with the server. Note that the configuration of the printing apparatus 100, the software configuration, and so on in the third embodiment are the same as in the aforementioned first embodiment, and thus descriptions thereof will be omitted.

Figure 7A:
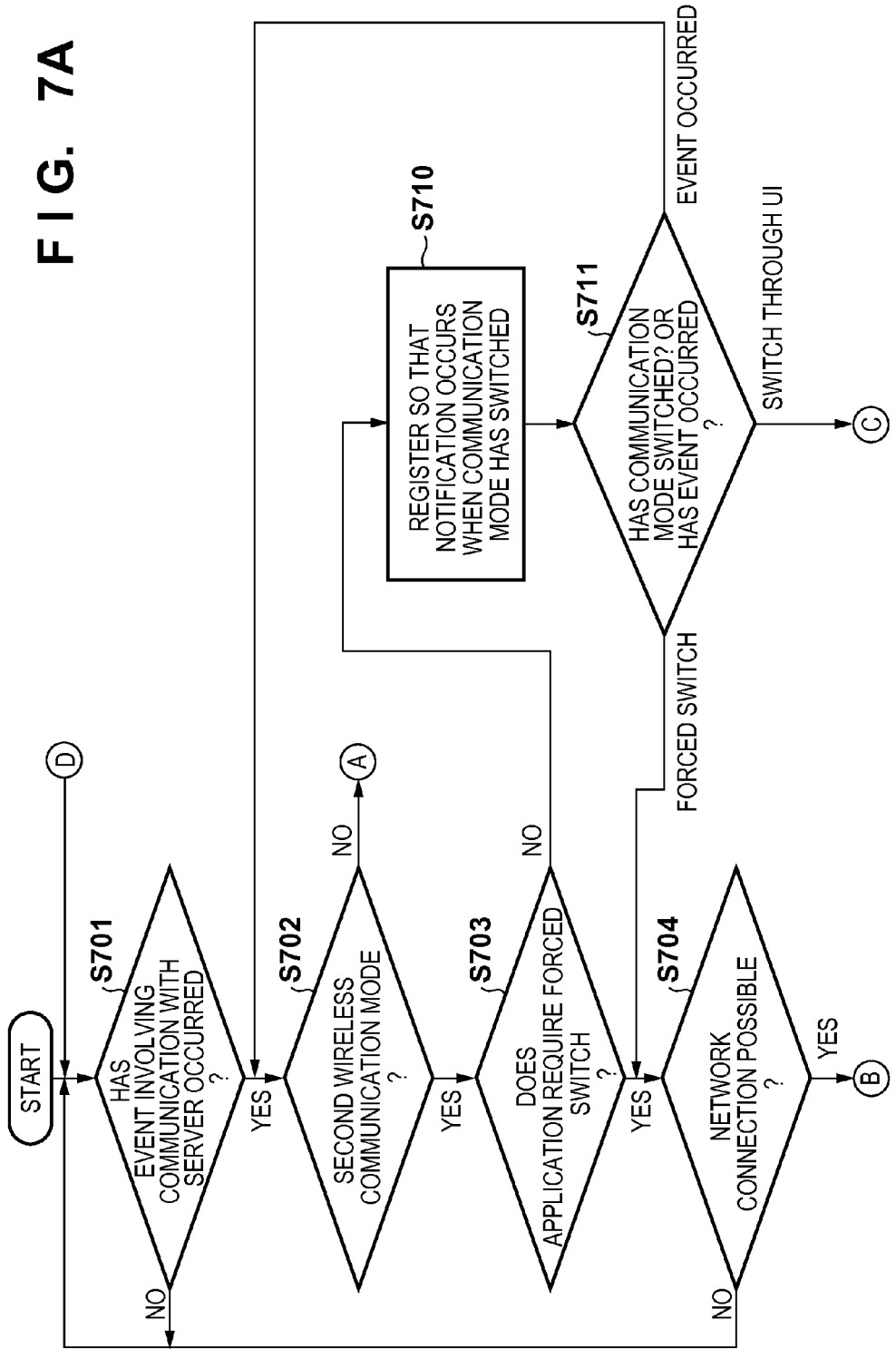

FIGS. 7A and 7B are flowcharts illustrating a process carried out by the printing apparatus 100 when a communication request for communicating with the server has occurred and communication is carried out having determined whether or not to switch the communication mode based on the urgency, reliability, and so on of an application, according to the third embodiment of the present invention. S701 to S715 indicate respective processing steps; a program for causing the CPU 202 to execute a control procedure corresponding to the steps is loaded into the RAM 203 of the controller 201 at the time of execution, and the processing thereof is implemented by the CPU 202 executing that program.

First, in S701, the CPU 202 determines whether or not an event involving communication with the server 120 has occurred, in the same manner as in S501. In the case where it has been determined that such an event has occurred, the process advances to S702, where the CPU 202 determines whether or not the current communication mode is the second wireless communication mode, in the same manner as in S502. In the case where it has been determined in S702 that the communication mode is not the second wireless communication mode, the process advances to S714. In S714, the CPU 202 determines whether or not a network connection is possible; in the case where the connection is possible, the process advances to S715, where the server 120 is notified of the occurrence of the event, and the process ends. This is the same processing as that carried out in S502, S507, and S508 of FIG. 5.

In the case where the CPU 202 has determined in S702 the printing apparatus 100 is operating in the second wireless communication mode, the process advances to S703. The application that produced the event requires an immediate and reliable response, and thus in S703, the CPU 202 immediately determines whether or not it is necessary to carry out processing for that event. In other words, the CPU 202 determines whether or not the type of the event makes it necessary to forcibly switch the communication mode from the second wireless communication mode to another mode and carry out communication immediately. To describe this process in terms of the example shown in FIG. 3, the mode switch determination unit 317 determines whether or not the application that produced the event requires that event to be immediately processed, and determines whether or not to forcibly switch the communication mode.

For example, the SNTP service 311 continues to operate according to the time currently set in the printing apparatus 100 even if communication with the server fails, and thus no major problems will occur. Likewise, with POP, even if communication with an email server fails, POP is originally not a function that requires real-time processing for receiving email, and thus no major problems will occur as long as the communication succeeds during the next connection. The mode switch determination unit 317 determines that it is not necessary to forcibly switch the communication mode in the case of such an application.

On the other hand, with the IPFAX service 314, the SMTP timed transmission function, and so on, it is the user's intent that the transmission occurs at the specified time without exceptions, and thus these applications affect the reliability of the printing apparatus 100. Likewise, the event notification service 313 is required to immediately notify an administrator or the like when the printing apparatus 100 has encountered an abnormal state. The mode switch determination unit 317 determines that it is necessary to forcibly switch the communication mode in the case of such application.

In the case where it has been determined in S703 that it is necessary to forcibly switch the communication mode, the process advances to S704, where the CPU 202 determines whether or not the printing apparatus 100 can connect to a network, in the same manner as S507. Here, in the case where it has been determined that the printing apparatus 100 cannot connect to a network, the CPU 202 returns the process to S701 without connecting to the server, and the printing apparatus 100 stands by until the next event for communicating with the server. In the case where the CPU 202 has determined in S704 that the printing apparatus 100 can connect to a network, the process advances to S705, and the same processes as those indicated in S604 to S608 of FIG. 6 and described in the aforementioned second embodiment are carried out in S705 to S709.

On the other hand, in the case where the CPU 202 has determined in S703 that it is not necessary to forcibly switch the communication mode, the process advances to S710, and the same processes as those indicated in S503 to S508 of FIG. 5 and described in the aforementioned first embodiment are carried out in S710 to S715. However, there are two triggers for switching the communication mode in S711, namely a case where the user has changed the communication mode settings through the console 211, and a case where the mode switch determination unit 317 has determined that it is necessary to forcibly switch the communication mode.

With the printing apparatus according to the third embodiment as described thus far, whether or not to communicate with the server can be controlled by determining whether or not to forcibly and automatically switch the communication mode based on the urgency, importance, and so on of the application that produced the event. Through this, the reliability of the printing apparatus can be ensured in a more consistent manner.

Fourth Embodiment

Figure 8A:
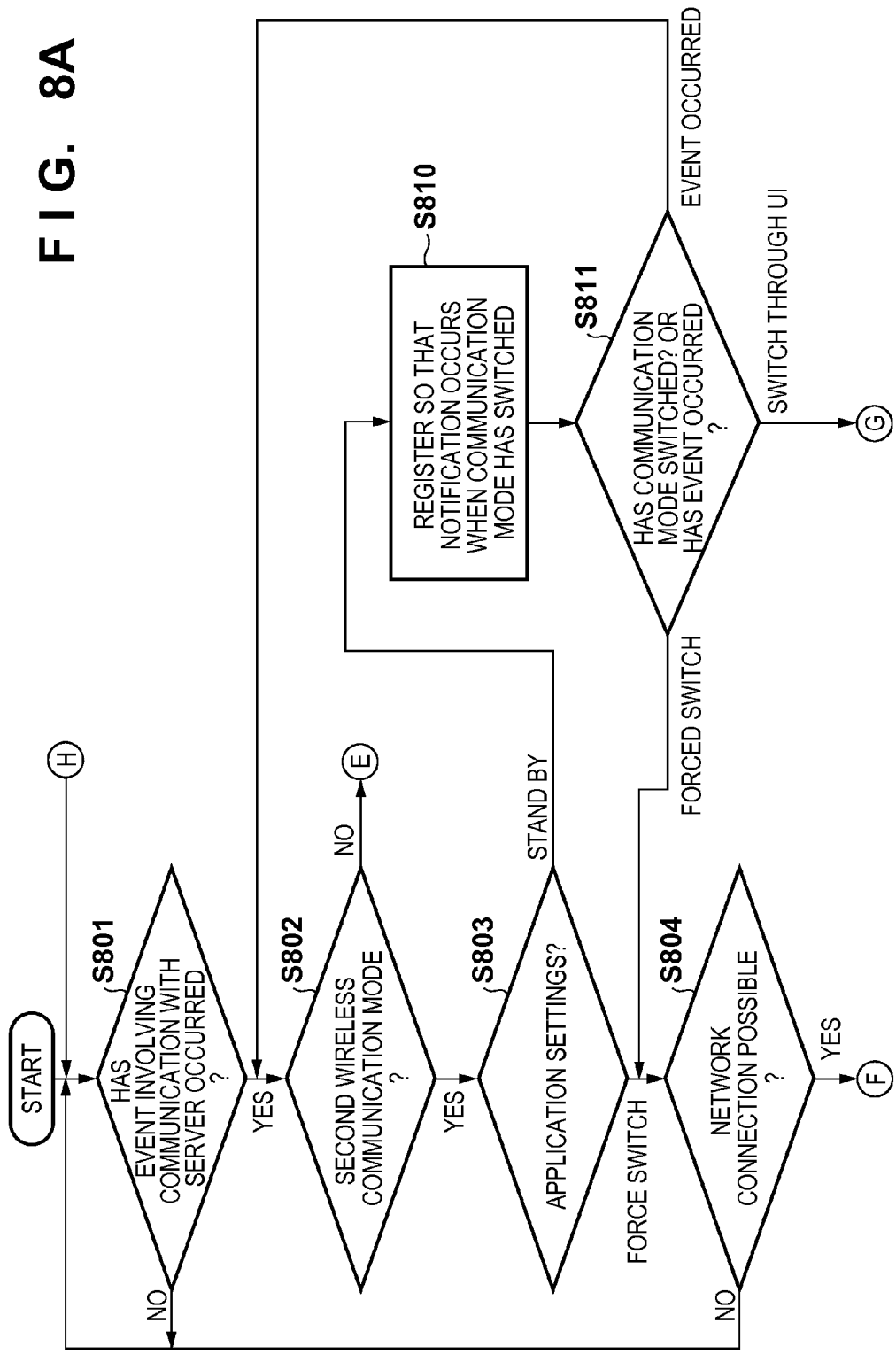
FIG. 8A and FIG. 8B are flowcharts illustrating a process performed by a printing apparatus, when a communication request for communicating with a server has occurred, for automatically determining whether a communication mode is to be switched based on a condition set by a user, according to a fourth embodiment of the present invention.
Figure 8B:
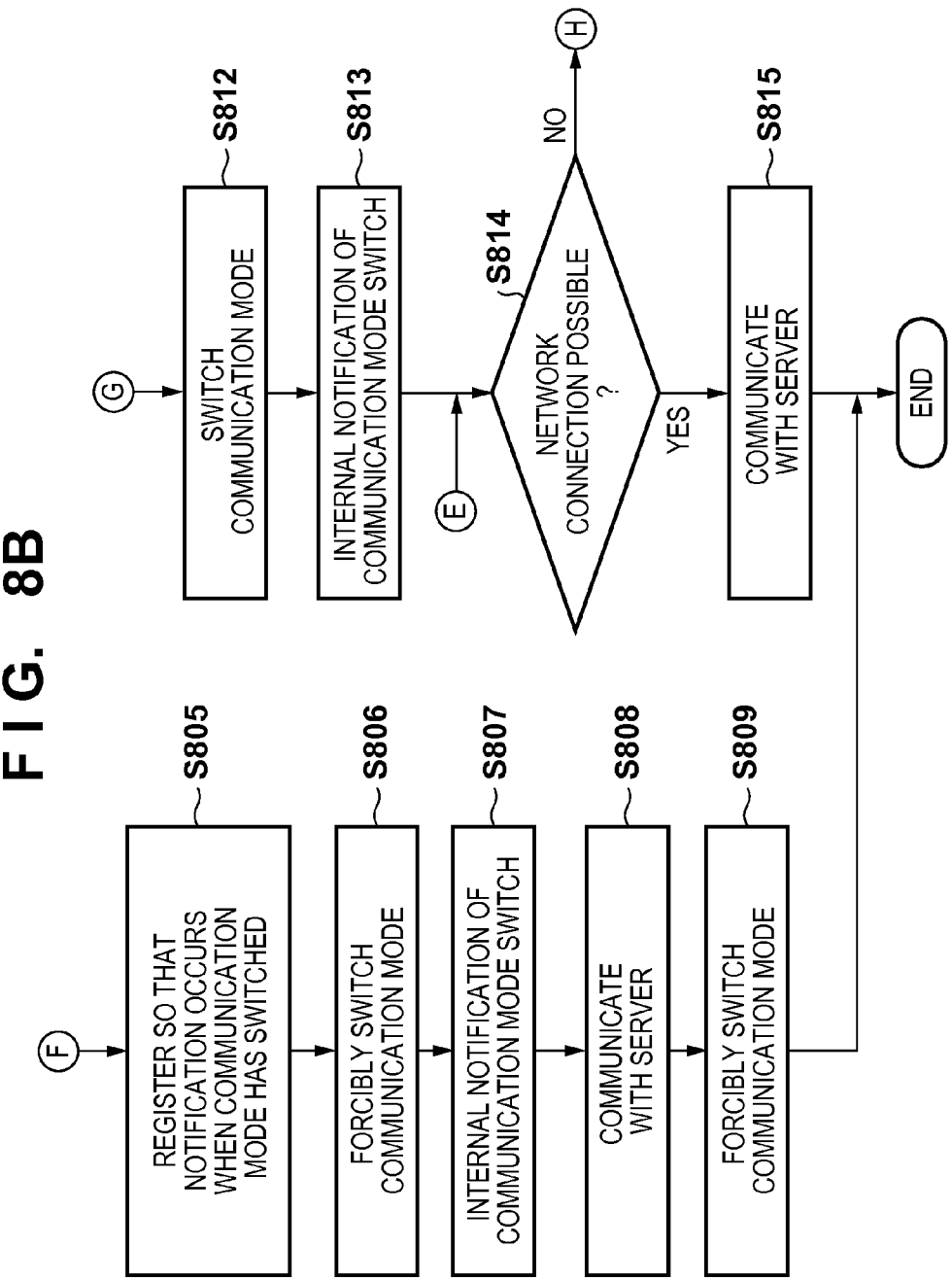

FIGS. 8A and 8B are flowcharts illustrating a process carried out by the printing apparatus 100, when a communication request for communicating with the server has occurred, for automatically determining whether a communication mode is to be switched based on a condition set by the user, according to a fourth embodiment of the present invention. S801 to S815 indicate respective processing steps; a program for causing the CPU 202 to execute a control procedure corresponding to the steps is loaded into the RAM 203 of the controller 201 at the time of execution, and the processing thereof is implemented by the CPU 202 executing that program.

In FIGS. 8A and 8B, the processes of S801 to S802 and S804 to S815 are the same as the processes of S704 to S715 in FIGS. 7A and 7B and described in the aforementioned third embodiment, and thus descriptions of those processing steps will be omitted.

FIG. 9 is a diagram illustrating an example of a screen displayed in the console 211 of the printing apparatus 100 according to the present fourth embodiment.

The display example shown in FIG. 9 is a display example in which it is possible to set whether or not to forcibly switch the communication mode when an event for communicating with the server has occurred in an application while the printing apparatus 100 is operating in the second wireless communication mode. For example, "force switch" is active in IPFAX settings, and thus the process for forcibly switching the communication mode is carried out during IPFAX timed transmission. Meanwhile, "stand by" for a communication mode switch is active in SNIP settings, and thus the SNIP service delays the communication processing until the communication mode of the printing apparatus 100 is switched due to some trigger. The values of these settings are saved in the storage unit 301.

Accordingly, in the case where the printing apparatus 100 is operating in the second wireless communication mode, in S803 of FIG. 8A, the mode switch determination unit 317 refers to the storage unit 301, loads the settings value set for that application by the user, and determines whether or not to forcibly switch the communication mode. Here, in the case where it is determined that "force switch" for forcibly switching the communication mode is set for that application, the process advances to S804, where the CPU 202 determines whether or not the printing apparatus 100 can connect to a network; in the case where the printing apparatus 100 can connect to the network, the communication mode is switched and the printing apparatus 100 communicates with the server 120. Meanwhile, in the case where it is determined in S804 that "stand by" is set, the process advances to S810, where no communication is carried out with the server 120; thereafter, no communication is carried out with the server 120 until the communication mode switches.

With the printing apparatus according to the present fourth embodiment, whether to switch the communication mode can be set for each application based on the user's intent, and thus the reliability of the printing apparatus can be ensured in a more consistent manner.

Fifth Embodiment

The second to fourth embodiments describe cases where the printing apparatus 100 forcibly switches the communication mode from the Wi-Fi Direct mode. From the standpoint of the mobile terminal 110 serving as the partner communicating with the printing apparatus 100, there is a problem in that the communication with the printing apparatus 100 will suddenly be interrupted and a user of the mobile terminal 110 will be unable to ascertain the cause of the interruption.

Figure 10A:
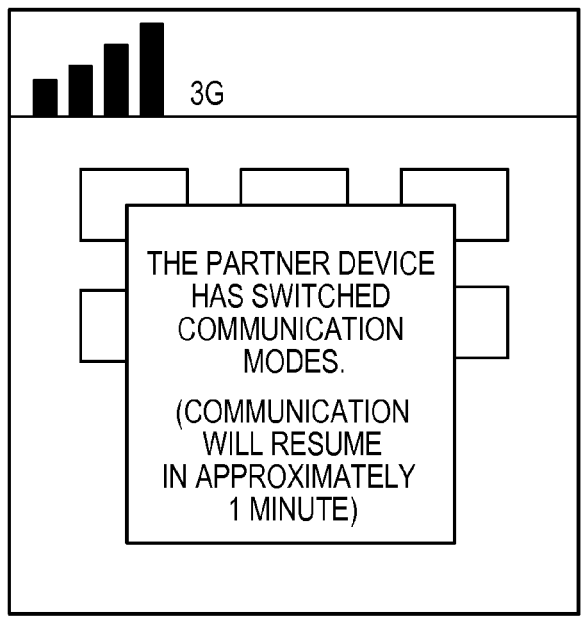
FIG. 10A and FIG. 10B are diagrams illustrating examples of images displayed in a communication terminal according to a fifth embodiment.

Accordingly, in a fifth embodiment, in the case where the printing apparatus 100 forcibly switches the communication mode, the mode switch external transmission unit 318 notifies the mobile terminal 110 that the switching process will start immediately before the process for forcibly switching the communication mode is carried out. Having received the notification that the switching process will start, the mobile terminal 110 presents a display indicating that the Wi-Fi Direct communication will be temporarily interrupted to the user, as shown in FIG. 10A. At this time, the time required to communicate with the server and the time required to restore communication after the switch is estimated based on the application, and a predicted time at which the communication will resume is included in the details of the notification.

Figure 10B:
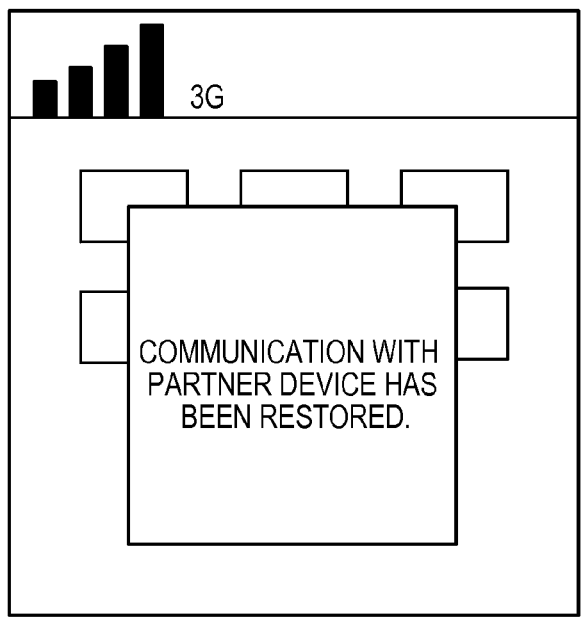

When the printing apparatus 100 has switched to the infrastructure mode, completed communication with the server 120, and switched back to the Wi-Fi Direct mode, the mode switch external transmission unit 318 transmits a notification that communication will resume to the mobile terminal 110. Having received the notification that communication will resume, the mobile terminal 110 presents a display indicating that the communication will resume to the user of the mobile terminal 110, as indicated in FIG. 10B.

According to the present fifth embodiment, the user of the mobile terminal 110 that is wirelessly communicating with the printing apparatus 100 can understand the cause of a communication interruption and an approximate duration of the interruption.

Other Embodiments

Although the above embodiments describe the Wi-Fi Direct mode as an example of the second wireless communication mode, the present invention is not limited to the Wi-Fi Direct mode. Any type of communication mode can be employed as the second wireless communication mode as long as it enables a given apparatus to directly connect to another apparatus through wireless communication.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-054143, filed Mar. 15, 2013, which is hereby incorporated by reference herein in its entirety.

What is claimed is:

1. A communication apparatus, comprising:
a wireless communication unit capable of executing direct wireless communication between a communication terminal and the communication apparatus with one of the communication terminal and the communication apparatus functioning as an access point;
a communication unit capable of executing communication between an external apparatus and the communication apparatus, which is a different communication method from communication using the wireless communication unit;
a determination unit configured to determine whether or not the wireless communication unit is executing communication in a case where a communication request for communicating with the external apparatus has occurred; and
a control unit configured to, in a case where the determination unit has determined that the wireless communication unit is executing communication, control the communication apparatus to not communicate with the external apparatus based on the communication request until the communication method switches from communication using the wireless communication unit to communication using the communication unit, and cause the communication unit to communicate with the external apparatus based on the communication request in response to switching of the communication method from communication using the wireless communication unit to communication using the communication unit.

2. The communication apparatus according to claim 1, wherein the control unit is further configured to, depending on a type of the communication request, wait to communicate with the external apparatus based on the communication request until the communication method switches from communication using the wireless communication unit to communication using the communication unit, or forcibly switch the communication method from communication using the wireless communication unit to communication using the communication unit.

3. The communication apparatus according to claim 2, wherein the control unit is configured to forcibly switch the communication method from communication using the wireless communication unit to communication using the communication unit when it is determined that the communication request requires an immediate response.

4. The communication apparatus according to claim 1, wherein the communication method of the wireless communication unit is communication based on a Wi-Fi Direct mode.

5. The communication apparatus according to claim 1, wherein the communication method of the communication unit is a communication method using a wired LAN or a communication method in which the external apparatus and the communication apparatus communicate wirelessly via an access point.

6. A communication apparatus, comprising:
a wireless communication unit capable of executing direct wireless communication between a communication terminal and the communication apparatus with one of the communication terminal and the communication apparatus functioning as an access point;
a communication unit capable of executing communication between an external apparatus and the communication apparatus, which is a different communication method from communication using the wireless communication unit;
a determination unit configured to determine whether or not the wireless communication unit is executing communication in a case where a communication request for communicating with the external apparatus has occurred; and
a control unit configured to switch the communication method from communication using the wireless communication unit to communication using the communication unit and cause the communication unit to communicate with the external apparatus based on the communication request in response to the determination unit determining that the wireless communication unit is executing communication.

7. The communication apparatus according to claim 6, wherein the control unit is further configured to, depending on a type of the communication request, wait to communicate with the external apparatus based on the communication request until the communication method switches from communication using the wireless communication unit to communication using the communication unit, or forcibly switch the communication method from communication using the wireless communication unit to communication using the communication unit.

8. The communication apparatus according to claim 7, wherein the control unit is configured to forcibly switch the communication method from communication using the wireless communication unit to communication using the communication unit when it is determined that the communication request requires an immediate response.

9. The communication apparatus according to claim 6, further comprising:
a setting unit configured to set whether or not to end communication performed by the wireless communication unit in response to the communication request,
wherein the control unit is configured to perform, in accordance with the setting performed by the setting unit, control for switching from communication using the wireless communication unit to communication using the communication unit in response to the communication request.

10. The communication apparatus according to claim 6, further comprising:
a switching unit configured to switch to the communication method of the wireless communication unit, after communication using the wireless communication unit has been forcibly ended and communication with the external apparatus using the communication unit has completed.

11. The communication apparatus according to claim 6, further comprising:
a notification unit configured to notify the communication terminal that the communication method has been switched when communication using the wireless communication unit has been forcibly ended.

12. The communication apparatus according to claim 11, wherein the notification includes a predicted time indicating an amount of time until communication with the communication terminal will be resumed.

13. The communication apparatus according to claim 6, wherein the communication method of the wireless communication unit is communication based on a Wi-Fi Direct mode.

14. The communication apparatus according to claim 6, wherein the communication method of the communication unit is a communication method using a wired LAN or a communication method in which the external apparatus and the communication apparatus communicate wirelessly via an access point.

15. A communication system including an external apparatus, a communication apparatus, and a communication terminal,
wherein when the communication apparatus and the communication terminal are communicating in a wireless communication mode in which one of the communication terminal and the communication apparatus serves as an access point and the communication apparatus communicates wirelessly with the communication terminal, and a communication request for communicating with the external apparatus has occurred in the communication apparatus, the communication apparatus does not communicate with the external apparatus based on the communication request until a communication method switches from communication in the wireless communication mode to a communication method aside from the wireless communication mode; and
the communication with the external apparatus based on the communication request is executed when the communication method has switched from communication in the wireless communication mode to the communication method aside from the wireless communication mode.

16. A control method for a communication apparatus that communicates with a communication terminal, the method comprising:
executing direct wireless communication between a communication terminal and the communication apparatus with one of the communication terminal and the communication apparatus functioning as an access point;
executing communication between an external apparatus and the communication apparatus, which is a different communication method from the direct wireless communication;
determining whether or not the direct wireless communication is being executed in a case where a communication request for communicating with the external apparatus has occurred; and
in a case where it is determined that the direct wireless communication is being executed, controlling the communication apparatus to not communicate with the external apparatus based on the communication request until a communication method switches from the direct wireless communication to the different communication method, and causing communication with the external apparatus based on the communication request to be executed using the different communication method in response to switching of the communication method from the direct wireless communication to the different communication method.

17. A non-transitory computer readable storage medium storing a computer program for causing a computer to execute steps of a control method for a communication apparatus that communicates with a communication terminal, the method comprising:
executing direct wireless communication between a communication terminal and the communication apparatus with one of the communication terminal and the communication apparatus functioning as an access point;
executing communication between an external apparatus and the communication apparatus, which is a different communication method from the direct wireless communication;
determining whether or not the direct wireless communication is being executed in a case where a communication request for communicating with the external apparatus has occurred; and
in a case where it is determined that the direct wireless communication is being executed, controlling the communication apparatus to not communicate with the external apparatus based on the communication request until a communication method switches from the direct wireless communication to the different communication method, and causing communication with the external apparatus based on the communication request to be executed using the different communication method in response to switching of the communication method from the direct wireless communication to the different communication method.

* * * * *